May 8, 1951     W. H. EDMONDS ET AL     2,551,832
LOCKING MECHANISM FOR VEHICLE END GATES
Filed Aug. 28, 1945
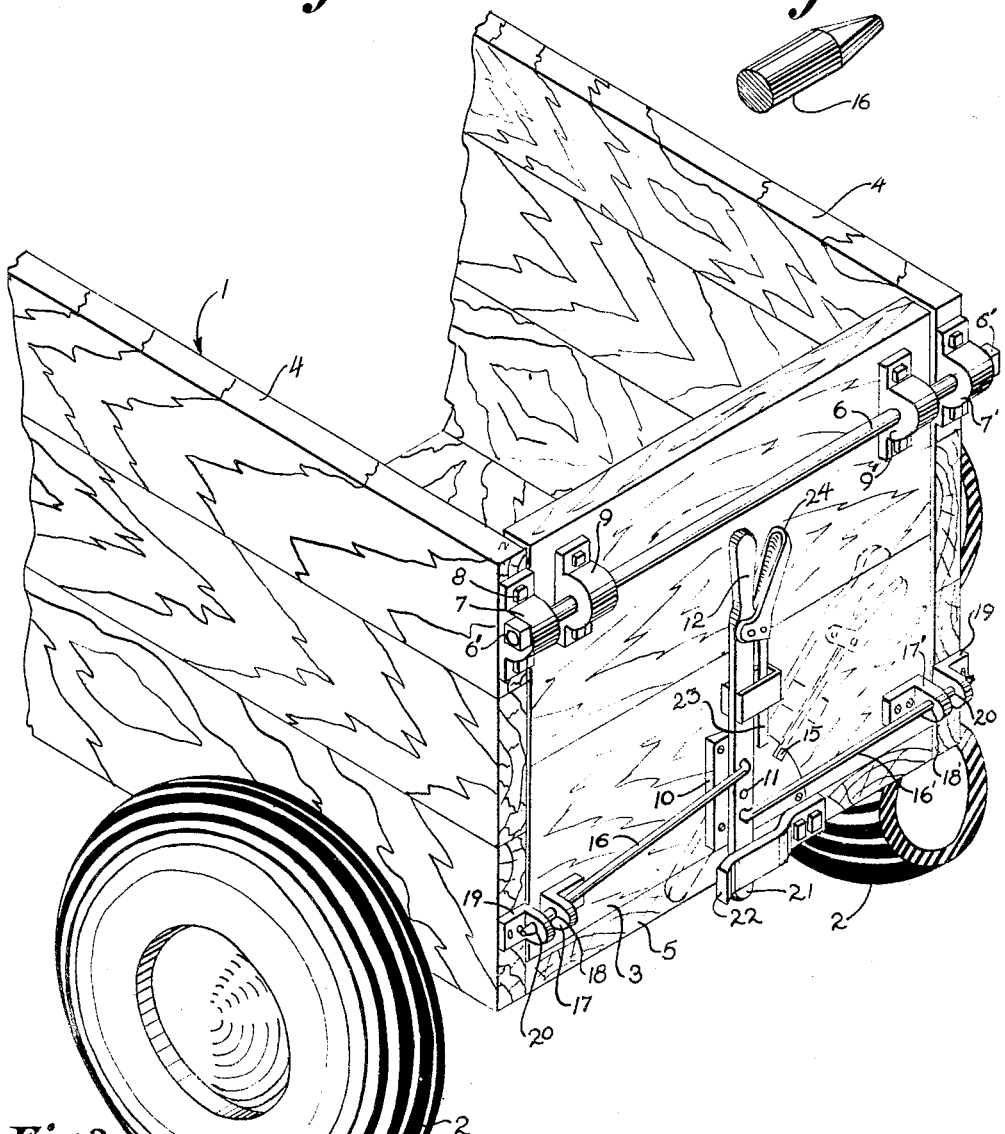
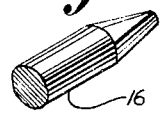
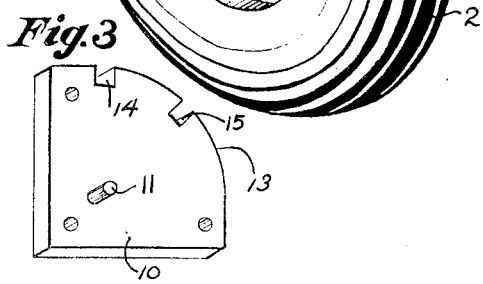
WILLIAM H. EDMONDS
CLEAVE F. EDMONDS
*INVENTORS.*
BY
*Wayland D. Keith*
HIS AGENT Patented May 8, 1951

2,551,832

UNITED STATES PATENT OFFICE 2,551,832

LOCKING MECHANISM FOR VEHICLE END GATES

William H. Edmonds, Goodlett, and Cleave F. Edmonds, Quanah, Tex.

Application August 28, 1945, Serial No. 613,126

1 Claim. (Cl. 292—7)

This invention relates to improvements in locking mechanism for vehicle end gates and particularly to slide bolt locking mechanisms that may be locked in open position as well as locked in closed position.

Various types of slide bolts for end gates have been used heretofore but these, for the most part have been inadequate in many respects, complicated and expensive to manufacture and difficult to install and to operate.

In unloading bulk material from a vehicle and particularly from a dump truck, much difficulty is frequently encountered and time consumed in removing and replacing end gates, or to keep them from dropping back into locked position after they have been opened.

The present invention provides for a simple and easy way of securing a vehicle end gate in place and for holding the locking mechanism in locked or unlocked position as desired. This locking mechanism makes it possible to have an end gate that fits tightly enough to provide an adequate closure for the truck body, but which, at the same time, may be readily released from its locked position and the locking mechanism secured in unlocked position as long as desired.

The primary object of this invention is to provide a locking mechanism for vehicle end gates that is simple in construction, positive in operation, inexpensive to manufacture and install and that is easy to operate.

Another object of this invention is to provide a locking mechanism for vehicle end gates that will lock the end gate in place to close the end of a dump truck but which may be readily released for emptying the truck, and the mechanism held in unlocked position until it is again desired to close and lock the end gate in place.

This invention is illustrated in the accompanying drawings in which:

Fig. 1 is a perspective view of the rear portion of a vehicle with the invention installed thereon; and with an alternate position of the operating lever shown in dashed outline;

Fig. 2 is an enlarged perspective view of a fragmentary end portion of one of the slide bolts removed from the locking mechanism; and Fig. 3 is a perspective view of the pivot plate.

With more detailed reference to the drawing the numeral 1 generally designates the body of a vehicle which is mounted in the usual manner upon wheels 2. The truck body 1 has an end gate 3 positioned between the upstanding sides 4 thereof, which end gate rests on the bottom 5 to form a tight closure for the end of the body or box 1.

While the truck body 1 is shown to be made of wood for purposes of illustration, it is to be understood that any suitable material may be used that is adaptable to truck body construction, such as reinforced sheet metal.

The end gate 3 is pivotally mounted in place on a rod 6. The rod 6 is received by supports 7 secured to the upper end portion of the sides 4 by screw bolts 8 and bearings 9, similarly secured to the end gate 3 and in alignment with said supports 7. The rod 6 is threaded at either end to receive nuts 6' which removably secure rod 6 in place. If it is desired to remove the end gate entirely, the nuts 6' are removed and the rod 6 slipped from the supports 7 and bearings 9, thus the entire end gate with the locking mechanism thereon may be readily removed from the truck.

A plate 10 is secured to the end gate 3 near the center and toward the bottom thereof and has a pivot pin 11 mounted thereon. The pivot pin 11 pivotally supports a lever 12.

An arcuate side 13 of the plate 10 has notches 14 and 15 disposed therein and which notches receive and hold the lever 12 in selected position. A slide bolt 16 is connected to the lever 12 at a predetermined distance above the pivot pin 11 in plate 10, the opposite end of which slide bolt passes through a hole 18 in a guide bracket 17 positioned at the lower outside edge of the end gate 3 and is received in a hole 20 of a locking bracket 19 secured to the lower end portion of the side member 4 of the truck body 1. The locking bracket 19 is so positioned as to be adjacent the guide bracket 17. A similar slide bolt 16' is secured to the lever 12 at a predetermined distance below the pivot pin 11 of plate 10 and is oppositely disposed with respect to slide bolt 16. The opposite end of the slide bolt 16' passes through hole 18' of guide bracket 17' and is received by hole 20' of locking bracket 19'. The guide bracket 17' and locking bracket 19' are disposed opposite the guide bracket 17 and locking bracket 19.

Upon movement of the lever 12 a sliding action will be imparted to the slide bolts 16—16'. The lever 12 has an extension 21 projecting downwardly therefrom in position to engage a lug 22 secured to the bottom 5 of the truck body 1.

The lever 12 has a slidable pawl 23, which pawl is operable by hand grip lever 24 adapted to selectively engage in notch 14 or 15 to hold the slide bolts 16—16' either in retracted or extended position, and at the same time hold extension 21 of lever 12 in engagement or out of engagement with the lug 22. The slide bolts 16—16' are at all times in guided relation in brackets 17 and 17'.

In unloading bulk material from a vehicle and more particularly when unloading bulk material from a dump type vehicle it is desirable to have and the present invention provides a tight fitting end gate with positive locking means engaging at either side and at the bottom when in closed position. Thus the end gate is securely held in locked position and readily released when desired. The locking means should be held unlocked until released, to prevent the accidental swinging back in place and locking of the end gate.

In the operation of this end gate locking mechanism, when the lever 12 is in the position as shown in full lines in Fig. 1, the slide bolts 16—16' secured to the lever 12 above and below the pivot pin 11 in plate 10, are in extended position. They pass through holes 18—18' in guide brackets 17—17' and project through holes 20—20' in locking brackets 19—19'. At the same time the lever extension 21 swings inside of lug 22, which lug 22 is bent outwardly to urge lever projection 21 toward the inside of the body 1 while the mechanism is closing. The slide bolts 16—16' are tapered at their outer ends to guide said rods into holes 20—20', even though the rods 16—16' are not in exact register with said holes.

With the lever 12 in upright position, as shown in full outline in Fig. 1, and with the slide bolts 16—16' extended, and with lever extension 21 interengaged with lug 22, the end gate 3 is locked in place. The pawl 23 of the hand grip lever 24 engages notch 14 to hold the locking elements in locked position.

When it is desired to release the locking elements 16, 16' and 21, the lever 12 is swung to the position as indicated in dashed outline in Fig. 1 and the pawl 23 engages the notch 15 in the arcuate side 13 of plate 10. This action withdraws the slide bolts 16—16' from the holes 20 and 20' and swings extension 21 out of engagement with lug 22, so that the end gate 3 may swing pivotally outward on transverse rod 6, that allows the material to pass from the body 1.

This locking arrangement provides a strong positive lock for the end gate 3 when in closed position, but which may be readily released to give a quick opening full throat gate.

Having thus described the invention, what is claimed is:

In a locking mechanism for locking a pivotally mounted end gate to a vehicle body having a bottom, an outstanding lug adapted to be mounted on said bottom, and upstanding sides having apertured lugs thereon, a plate mounted on said end gate and having an upstanding pivot pin mounted thereon at substantially right angles thereto said plate having one side arcuate with respect to said upstanding pivot pin, said arcuate surface being concentric with respect to said pivot pin and having notches therein to receive a pawl, a hand lever pivotally mounted on said upstanding pin and having a pawl adapted to engage said notches in said plate, an end of said lever protruding downward for engagement with the outstanding lug adapted to be mounted on said bottom of said vehicle body, transverse bars positioned respectively above and below said upstanding pivot pin which bars extend substantially parallel with the rear face of said end gate, said pivoted end gate having lugs with apertures therein mounted near an edge thereof and said apertures being aligned with apertures of the lugs on said upstanding sides in a certain position of said gate to permit said transverse bars to slide into the other upstanding, apertured lugs on said sides and also to disengage said lugs to permit free swinging action of said pivoted end gate, said pawl being adapted to lock said lever so said transverse bars and the lower projecting portion of said lever will either be in engaged or disengaged position and said transverse bars having conical points for guiding the transverse bars into said lugs on said sides of said vehicle body.

WILLIAM H. EDMONDS.
CLEAVE F. EDMONDS.

REFERENCES CITED

The following references are of record in the file of this patent:

UNITED STATES PATENTS

| Number | Name | Date |
|---|---|---|
| 215,430 | Beecher | May 20, 1879 |
| 509,941 | Perry | Dec. 5, 1893 |
| 1,258,234 | McKee | Mar. 5, 1918 |
| 1,655,489 | Anderson | Jan. 10, 1928 |
| 1,974,973 | Paul | Sept. 25, 1934 |